United States Patent [19]

Rubinstein et al.

[11] Patent Number: 4,959,781
[45] Date of Patent: Sep. 25, 1990

[54] SYSTEM FOR ASSIGNING INTERRUPTS TO LEAST BUSY PROCESSOR THAT ALREADY LOADED SAME CLASS OF INTERRUPT ROUTINES

[75] Inventors: Jon Rubinstein, Palo Alto; Kenneth C. Klingman, Portola, both of Calif.

[73] Assignee: Stardent Computer, Inc., Sunnyvale, Calif.

[21] Appl. No.: 194,457

[22] Filed: May 16, 1988

[51] Int. Cl.$^5$ .............. G06F 9/46; G06F 13/14; G06F 13/24; G06F 15/16

[52] U.S. Cl. .............. 364/200; 364/228.1; 364/230.2; 364/237.9; 364/244.7; 364/246.3; 364/263.2

[58] Field of Search ... 364/200 MS File, 900 MS File

[56] References Cited

U.S. PATENT DOCUMENTS

| | | | |
|---|---|---|---|
| 4,153,934 | 5/1979 | Sato | 364/200 |
| 4,268,904 | 5/1981 | Suzuki et al. | 364/200 |
| 4,271,468 | 6/1981 | Christensen et al. | 364/200 |
| 4,426,681 | 1/1984 | Bacot et al. | 364/200 |
| 4,630,193 | 12/1986 | Kris | 364/200 |
| 4,638,432 | 1/1987 | Niblock et al. | 364/200 |
| 4,779,195 | 10/1988 | James | 364/200 |

Primary Examiner—Archie E. Williams, Jr.
Assistant Examiner—Ayni Mohamed
Attorney, Agent, or Firm—Blakely, Sokoloff, Taylor & Zafman

[57] ABSTRACT

An apparatus and method for processing of interrupts in a computer system includes interrupts which are presented substantially simultaneously to each of a plurality of processors in the computer system. Each of the plurality of processors may respond to the interrupts and the first processor assigned to handle the interrupt prevents the other processors from handling the interrupts. The present invention further discloses means for disabling processors from responding to interrupts.

7 Claims, 4 Drawing Sheets

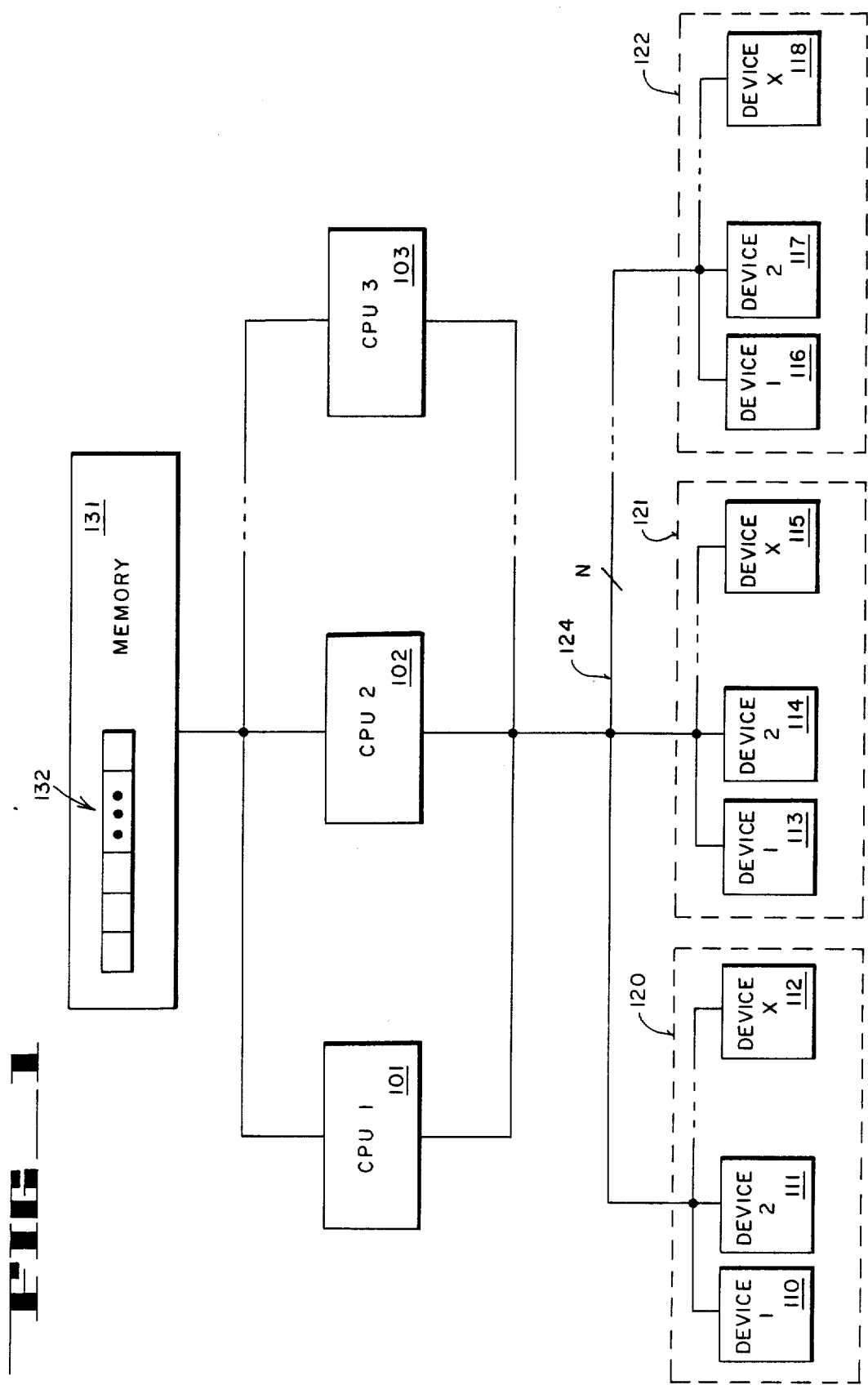
FIG_1

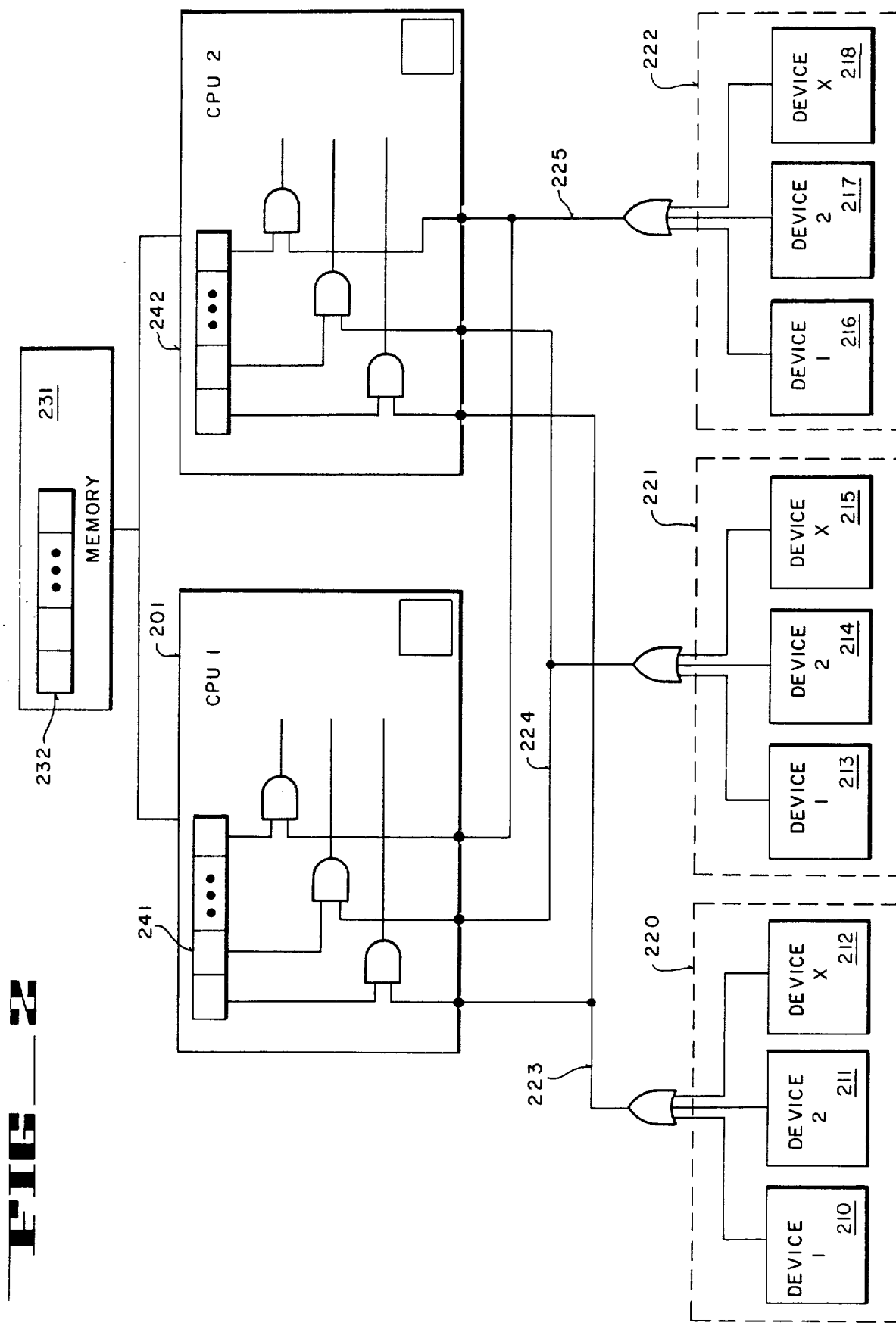
FIG.—2

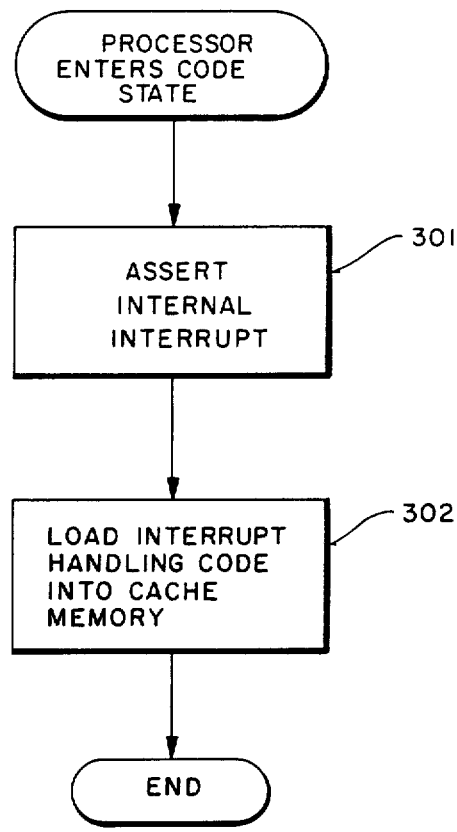
FIG_3

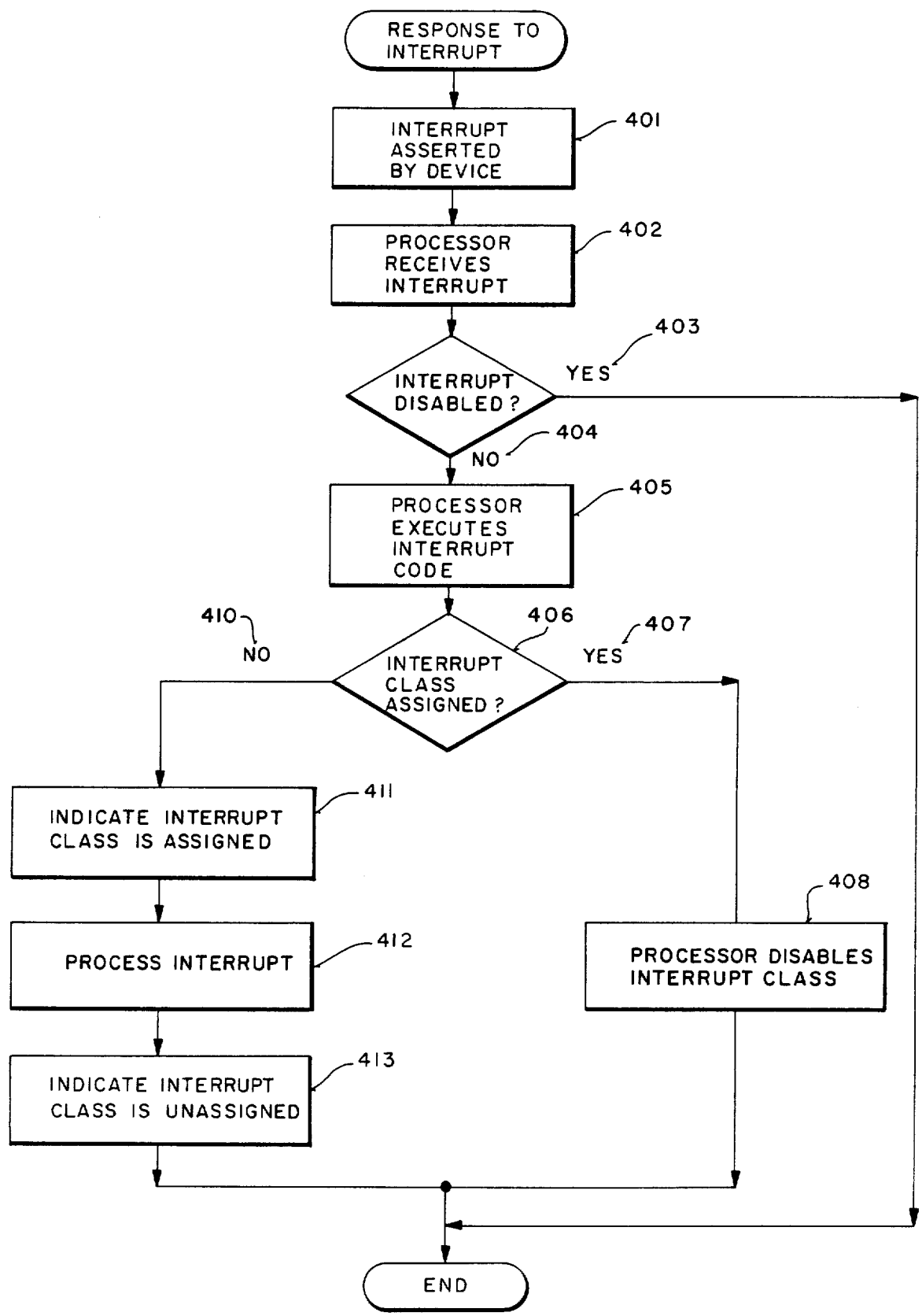

SYSTEM FOR ASSIGNING INTERRUPTS TO LEAST BUSY PROCESSOR THAT ALREADY LOADED SAME CLASS OF INTERRUPT ROUTINES

BACKGROUND OF THE INVENTION

1. Field of the Invention.

The present invention relates to the field of interrupt handling in computer systems and, more specifically, to interrupt handling in computer systems having multiple processors.

2. Prior Art.

A number of methods are known for handling interrupts in multiple processor computer systems. Generally, an interrupt may be defined as a response to an asynchronous or exceptional event that causes a processor to interrupt and save the current CPU status to allow for a later restart and causes a transfer to a specified routine called an interrupt handler. Typically, interrupts are assigned to classes, with a particular class including interrupts from similar devices or apparatus or interrupts which may be handled in a similar manner.

In a first known method, all interrupts from a particular class are assigned to and handled by a particular processor. Classes may be assigned to processors evenly over the processors in the computer system, may all be assigned to a single processor, or some other combination of assignment of classes to processors may be utilized.

In a second known method, a master processor initially services all interrupt requests and assigns the request to other processors or services the interrupt itself.

In a third known method, interrupts are serviced by processors in a round-robin fashion, in which a token is passed from processor to processor. When a processor completes service of interrupts, the token is passed to the next processor. The processor currently processing the token is assigned to process interrupts occurring while the processor possess the token.

In each of these methods of processing interrupts, an objective is to minimize impact on other system processing while processing the interrupts in an efficient manner. However, in each of the known methods, one processor may be idle while another processor which may not be idle is burdened with processing an interrupt. For example, in a processor utilizing the first method, fixed assignments of interrupt classes to particular processors, processor one may be idle. Processor two may be assigned to handle all interrupts occurring in Class A. Processor two may be currently busy executing a process when an interrupt occurs in Class A. In such a case, processor two must interrupt its processing of the current process to service the interrupt. At the same time, processor one remains idle. Similar inefficiencies occur in any interrupt handling system in which interrupts are assigned to a given processor during any given period of time without regard to the relative load placed on that processor.

Therefore, what is desired is an interrupt handling apparatus and method in which interrupts are assigned to the processor in the system which is currently least busy. It is further desired to provide an apparatus and method in which interrupts of a same class may be assigned to the same processor where that processor has already loaded the appropriate interrupt handling routines.

SUMMARY OF THE INVENTION

An apparatus and method for managing interrupts in a multiple processor computer system is described. The apparatus comprises a symmetrical multiple processor computer system with each external interrupt source being available to each processor in parallel, a means of individually disabling each interrupt source on each processor without any implied priority, and a means to cause an interrupt independent of any external device. Additional apparatus includes synchronization primitives between processors. Each processor in the system responds to external interrupts. The synchronization apparatus guarantees one processor will be first to respond to the interrupt and later responding processors will then disable that interrupt class for a period of time, thereby relieving themselves of interrupt processing overhead. When a processor enters an idle state, the processor generates an internal, interrupt which causes interrupt handling code to be placed in instruction cache memory. Thus, an idle processor will respond to an interrupt faster than a busy processor because of having preloaded interrupt handling code. Therefore, the idle processor will be the processor selected to service future interrupts causing a self-balancing of processing load over the processors in the system.

BRIEF DESCRIPTION OF THE DRAWINGS

FIG. 1 is a block diagram illustrating a computer system utilizing the apparatus and method of the present invention.

FIG. 2 is a block diagram further illustrating a computer system utilizing the apparatus and method of the present invention.

FIG. 3 is a flowchart illustrating the steps of a processor entering an idle state as may be utilized by the present invention.

FIG. 4 is a flowchart illustrating the steps of responding to an interrupts as may be utilized by the present invention.

DETAILED DESCRIPTION OF THE PRESENT INVENTION

An interrupt handling apparatus and method is described. In the following description, numerous specific details are set forth such as types of devices, number of processing units, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

The present invention relates to an apparatus and method for managing interrupts in a computer system. As shown by FIG. 1, the present invention is utilized in a computer system having a plurality of central processing units (CPUs) 101-103 which, among other functions, support a plurality of devices or other apparatus which may generate external interrupts to the processors 110-118. The devices 110-118 are divided into a plurality of classes 120-122.

In the preferred embodiment, the plurality of CPUs 101-103 comprise between 1 and 4 processors manufactured by MIPS COMPUTERS, INC. of Sunnyvale, Calif. The devices 110-118 are separated into three classes: a first class comprising disk drives, tape drives and other mass storage devices, a second class comprising terminals, keyboards, other human interface apparatus and communication ports, and a third class comprising miscellaneous user attached devices and output devices such as printers.

The present invention further comprises a memory 131 having a plurality of memory locations 132. Each of the plurality of memory locations 132 are associated with one of the plurality of interrupt classes 120 to 122. The plurality of memory locations 132 indicate whether the interrupt class is assigned to a processor for processing or is unassigned. In the preferred environment, the plurality of memory locations comprises a number of bits in a word. A 1 in the bit corresponding to an interrupt class indicates the interrupt class is unassigned and a 0 indicates the interrupt class is assigned.

The devices 110-118 may be coupled to the processors 101-103 over interrupt lines 124 for asserting interrupts to the processors 101-103. The interrupt lines 124 comprise N interrupt lines, where N is the number of interrupt classes. Alternatively, the devices 110-118 may be coupled to a bus and interrupts may be broadcast over the bus. In the case of broadcasting interrupts over the bus, the computer system utilizes N types of broadcasts, one corresponding to each of the interrupt classes.

Referring now to FIG. 4, a method utilized by the present invention for responding to interrupts from devices in interrupt classes 120-122 is disclosed. One of the devices, such as device 110 of FIG. 1, may assert an interrupt, block 401.

As discussed previously, the device 110 may assert the interrupt by asserting an interrupt signal on an interrupt line or, alternatively, may broadcast the interrupt over the system bus. The processor receives the interrupt, block 402.

Although FIG. 4 illustrates an interrupt being serviced by a single processor, in the preferred embodiment all processors 101-103 in the computer system attempt to respond to the interrupt. As will be discussed, the processor which is first to begin servicing of the interrupt will block the other processors from servicing the interrupt. In the preferred embodiment typically, where a processor in the system is idle, the idle processor will be the first to begin servicing of the interrupt. Where more than one processor in the system is in an idle state, any of the idle processors may be the first to begin servicing the interrupt. If none of the processors in the system are in an idle state, any of the processors may be the first to begin servicing the interrupt, however, in the preferred embodiment, typically the last processor to have serviced an interrupt will be selected. This is because the last processor to have serviced an interrupt is most likely to have already loaded in its cache memory some or all of the interrupt handling code necessary for servicing the interrupt.

The processor determines whether the interrupt class has been disabled. Referring briefly to FIG. 2, a plurality of mask bits in registers 241 and 242 are utilized by each processor in the preferred embodiment to mask off or disable interrupts from interrupt classes. As will be explained in more detail in connection with FIG. 2, setting a mask bit corresponding to an interrupt class to a 0 will effectively mask interrupts from that interrupt class.

If the interrupt has been disabled, branch 403, the processor continues processing the process it was servicing when the interrupt occurred and the CPU is effectively blocked from receiving the interrupt.

If the interrupt is not disabled, branch 404, the processor executes interrupt code, block 405. The interrupt code initially determines whether the interrupt class is assigned for processing by another processor, block 406. As discussed in connection with FIG. 1, the preferred embodiment utilizes a plurality of memory locations 132 to indicate whether each of the interrupt classes are currently assigned.

If the interrupt class is assigned for processing by another processor, branch 407, the processor disables itself from processing interrupts in the class for a predetermined period of time, block 408. In the preferred embodiment, the predetermined period of time corresponds to a multiple of system clock cycle time and averages 5 milliseconds. In all cases in the preferred embodiment, the class is enabled within 10 milliseconds. Disabling of interrupt classes allows a processor to effectively ignore the class of interrupt and increases processor efficiency.

If the interrupt class is not assigned, branch 410, the processor causes the interrupt class to be assigned, block 411. A processor may cause an interrupt class to be assigned in the preferred embodiment by setting the bit in memory location 132 to a 0. All processors later accessing the memory location 132 to determine whether the interrupt class is assigned will find the bit to be a 0 and assume the interrupt class has been assigned and is being processed by another processor.

The computer system of the preferred embodiment utilizes a semaphore mechanism described in more detail in co-pending U.S. patent application Ser. No. 161997, filed on Feb. 29, 1988, titled Load and Synchronize Computer Architecture and Process, which is assigned to the assignee of the present invention. The semaphore mechanism is utilized to insure that when a first processor is updating one of the plurality of memory locations 132 of FIG. 1, that a second processor does not simultaneously access the memory location.

The processor then processes the interrupt, block 412. At anytime during processing of the interrupt by the processor, block 412, a second interrupt may occur. When a second interrupt occurs, the processor will be interrupted from processing of the first interrupt and will execute the steps of FIG. 4 in response to the second interrupt. If the second interrupt is of the same interrupt class as the first interrupt, it will be processed by the same processor. All other processors will have indicated they are disabled from processing interrupts from the interrupt class, block 403, or will find the interrupt class to have been assigned, block 406. In this way, the same processor continues to service all interrupts of the same class until there are no pending interrupts in the class. This method leads to efficiencies in processing due to not having to load and reload interrupt handling routines for the class.

If the interrupt class of the second interrupt is not the same as the interrupt class of the first interrupt, the interrupt may be processed by any of the available processors.

After completing processing of all pending interrupts in the class, the processor causes the interrupt class to be unassigned, block 413.

The present invention insures that an idle processor will service interrupts by preloading the cache memory of the idle processor with interrupt handling code when the processor becomes idle. In this way, the idle processor will be the first of the plurality of processors to execute interrupt handling code, block 406. The busy processors will take longer to execute the interrupt handling code because the code must first be loaded into their cache memories. Therefore, the preloaded processor is assigned the interrupt class, block 411, and the remaining processors will determine the class is assigned, branch 407 and disable processing in that class, block 408.

Referring to FIG. 3, the method of preloading interrupt code into cache memory is described. The MIPS COMPUTERS processors utilized by the preferred embodiment of the present invention allow processors to signal an internal interrupt. In the present invention, whenever a processor enters an idle state, the processor signals an internal interrupt, block 301, which causes interrupt handling code to be loaded into cache memory, block 302. In this way, interrupt handling code is preloaded in idle processors.

It will be obvious to one of ordinary skill that other apparatus or methods may be employed by the present invention to insure that idle processors service interrupts before busy processors. For example, a signal may indicate that a processor is idle and circuitry may be employed to present interrupts to processors asserting the idle signal prior to presenting the interrupts to busy processors.

Referring to FIG. 2, the present invention utilizes a plurality of mask bits, such as mask bits stored in registers 241 and 242, corresponding to each of the interrupt classes for enabling or disabling interrupt classes by a particular processor. As previously discussed in connection with corresponding portions of FIG. 1, the interrupts generated by devices 210–218 are grouped in interrupt classes, such as classes 220, 221 and 222. When any of the devices in a class, such as device 210, asserts an interrupt, the interrupt signal is OR'ed with the other interrupt signals in the class and an interrupt signal line such as line 223, 224 or 224 is brought high in response to asserting the interrupt. Each of the processors, such as processors 201 and 202 receive interrupt signals 223, 224 and 225 substantially simultaneously.

The interrupt signals 223, 223 and 225 are AND'ed with corresponding mask bits stored in registers 241 and 242. If the mask bit is a zero, the interrupt is disabled and the processor continues with processing of its current process effectively ignoring the interrupt. If the mask bit is a one, the processor loads and executes interrupt code as discussed in connection with FIG. 4.

If an interrupt is asserted and the corresponding mask bit is a one, the processor first accesses the memory bit in memory register 232 corresponding to the interrupt class. As discussed previously, a one indicates the interrupt class is unassigned and a zero indicates the memory class is assigned. If the memory class is assigned, the processor sets its internal mask bit in register 241 or 242 corresponding to the interrupt class to zero. This effectively causes the processor to ignore or disable processing of interrupts in the interrupt class.

All processors in the computer system of the preferred embodiment reset their mask bits stored in registers 241 and 242 to a one approximately every 10 milliseconds. Resetting the mask bits insures a processor is available for processing of interrupts at least within 10 milliseconds of the interrupt being asserted.

Although the present invention has been described with specific reference to a number of details of the preferred embodiment, it will be obvious that a number of modifications and variations may be employed without departure from the scope and spirit of the present invention. Accordingly, all such variations and modifications are included within the intended scope of the invention as defined by the following claims.

Thus, an apparatus and method for processing interrupts in a computer system having a plurality of processing units is described.

We claim:

1. A computer system having means for processing interrupts comprising:
   one to four MIPS processors for servicing interrupts, each of said processors having means for disabling processing of said interrupts, each of said means for disabling processing of said interrupts comprising a register means having Y memory areas, where Y is a positive number, each of said Y memory areas corresponding to one of Y interrupt classes, said means for disabling processing of interrupts further comprising Y logic gates, each of said Y logic gates having as inputs a signal line from one of said Y memory areas, and a signal line from one of said Y interrupt classes;
   a plurality of devices for asserting interrupts, each of said plurality of devices for asserting interrupts coupled to all of said processors for substantially at the same time asserting interrupts to each of said processors, said plurality of devices grouped into said Y interrupt classes;
   memory means coupled to all of said processors, said memory means having Y memory locations, each of said Y memory locations corresponding to one of said Y interrupt classes, each of said Y memory locations for indicating whether each of said corresponding Y interrupt classes has been assigned for processing by one of said processors;
   means for assigning processing of all interrupts corresponding to one of said Y interrupt classes to one of said N processors.

2. The computer system as recited by claim 1, wherein said Y interrupt classes comprises three input classes.

3. The computer system as recited in claim 2, wherein Y memory locations comprises three bits of memory.

4. A computer system having means for processing interrupts comprising:
   one to four processors for servicing interrupts, each of said processors having means for disabling processing of said interrupts, said means for disabling processing of said interrupts comprising a register means having Y memory areas, each of said Y memory areas corresponding to one Y interrupt classes, said means for disabling processing of interrupts further comprising Y AND gates, each of said Y AND gates having as inputs a signal line from one of said Y memory areas, and a signal line from one of said Y interrupt classes;
   a plurality of devices for asserting interrupts, each of said plurality of devices for asserting interrupts coupled to all of said processors for substantially at the same time asserting interrupts to each of said processors, said plurality of devices grouped into Y interrupt classes, wherein Y is a positive integer;
   memory means coupled to all of said processors, said memory means having Y memory locations, each of said Y memory locations corresponding to one of said Y interrupt classes, each of said Y memory locations for indicating whether each of said corresponding Y interrupt classes has been assigned for processing by one of said processors;

means for assigning processing of all interrupts corresponding to one of said Y interrupt classes to one of said processors.

5. The computer system as recited by claim 4, wherein said Y interrupt classes comprises three interrupt classes.

6. The computer system as recited in claim 5, wherein Y memory locations comprises three bits of memory.

7. The computer system as recited by claim 6, wherein each of said processors are MIPS processors.

* * * * *